US012573604B2

(12) United States Patent
Schoell et al.

(10) Patent No.: US 12,573,604 B2
(45) Date of Patent: Mar. 10, 2026

(54) RESIDUAL GAS ANALYSER, AND EUV LITHOGRAPHY SYSTEM HAVING A RESIDUAL GAS ANALYSER

(71) Applicant: Carl Zeiss SMT GmbH, Oberkochen (DE)

(72) Inventors: Achim Schoell, Kitzingen (DE); Dirk Ehm, Beckingen (DE); Yessica Brachthaeuser, Cologne (DE); Thorsten Benter, Haan (DE)

(73) Assignee: CARL ZEISS SMT GMBH, Oberkochen (DE)

( * ) Notice: Subject to any disclaimer, the term of this patent is extended or adjusted under 35 U.S.C. 154(b) by 509 days.

(21) Appl. No.: 18/099,656

(22) Filed: Jan. 20, 2023

(65) Prior Publication Data

US 2023/0162967 A1 May 25, 2023

Related U.S. Application Data

(63) Continuation of application No. PCT/EP2021/069591, filed on Jul. 14, 2021.

(30) Foreign Application Priority Data

Jul. 21, 2020 (DE) ..................... 10 2020 209 157.9

(51) Int. Cl.
*H01J 49/42* (2006.01)

(52) U.S. Cl.
CPC .................................. *H01J 49/421* (2013.01)

(58) Field of Classification Search
USPC .................................................. 250/281, 282
See application file for complete search history.

(56) References Cited

U.S. PATENT DOCUMENTS 4,535,236 A * 8/1985 Batey ...................... H01J 41/10 250/282
5,672,870 A 9/1997 Flory et al.
(Continued)

FOREIGN PATENT DOCUMENTS

DE 19629545 A1 6/1997
DE 102019208278 A1 8/2019
(Continued)

OTHER PUBLICATIONS

German Office Action with English translation, Application No. 10 2020 209 197.9, 4 pages, Nov. 3, 2021.
(Continued)

*Primary Examiner* — Kiet T Nguyen
(74) *Attorney, Agent, or Firm* — Edell, Shapiro & Finnan, LLC

(57) ABSTRACT

A residual gas analyser (40) for analysis of a residual gas (30), in particular a residual gas in an EUV lithography system (1), includes an inlet system (41) for admission of the residual gas from a vacuum environment (27*a*) into the residual gas analyser, and a mass analyser (43) having a detector (44) for detecting ionized constituents (30*a*) of the residual gas. The residual gas analyser includes an ion transfer device (42) for transferring the ionized constituents of the residual gas to the mass analyser, the ion transfer device having an ion filtering device (45) configured for filtering at least one ionic constituent (30*a*) of the residual gas. Also disclosed is an EUV lithography system, in particular an EUV lithography apparatus, which includes at least one residual gas analyser configured as indicated above for analysing a residual gas in a vacuum environment of the EUV lithography system.

12 Claims, 2 Drawing Sheets

(56) References Cited

U.S. PATENT DOCUMENTS

| | | | | |
|---|---|---|---|---|
| 7,928,375 | B1 * | 4/2011 | Mangan | H01J 49/4225 250/283 |
| 2011/0211179 | A1 | 9/2011 | Kraus et al. | |
| 2013/0048851 | A1 | 2/2013 | Kumano et al. | |
| 2014/0166878 | A1 * | 6/2014 | Wright | H01J 49/061 250/288 |
| 2016/0111269 | A1 | 4/2016 | Fedosenko et al. | |
| 2020/0183292 | A1 | 6/2020 | Becker et al. | |
| 2022/0005682 | A1 | 1/2022 | Chung et al. | |
| 2022/0230865 | A1 | 7/2022 | Brachthaeuser et al. | |

FOREIGN PATENT DOCUMENTS

| | | | |
|---|---|---|---|
| DE | 102018216623 | A1 | 4/2020 |
| JP | H0180672 | A | 5/1989 |
| KR | 20110056282 | A | 5/2011 |
| KR | 20200035406 | A | 4/2020 |
| WO | 2010022815 | A1 | 3/2010 |
| WO | 2020064201 | A1 | 4/2020 |

OTHER PUBLICATIONS

International Preliminary Report on Patentability, PCT/EP2021/069591, Jan. 24, 2023, 7 pages.

Research Disclosure, disclosed anonymously, www.researchdisclosure.com; published in the May 2020 paper journal, Research Disclosure database No. 673053, Apr. 20, 2020, 5 pages.

International Search Report, PCT/EP2021/069591, Oct. 18, 2021, 5 pages.

Korean Office Action with English translation, Application No. 2019P00667WOKR, Jul. 11, 2025, 13 pages.

* cited by examiner

RESIDUAL GAS ANALYSER, AND EUV LITHOGRAPHY SYSTEM HAVING A RESIDUAL GAS ANALYSER

CROSS-REFERENCE TO RELATED APPLICATION

This is a Continuation of International Application PCT/EP2021/069591, which has an international filing date of Jul. 14, 2021, and the disclosure of which is incorporated in its entirety into the present Continuation by reference. This Continuation also claims foreign priority under 35 U.S.C. § 119(a)-(d) to and also incorporates by reference, in its entirety, German Patent Application DE 10 2020 209 157.9 filed on Jul. 21, 2020.

FIELD OF THE INVENTION

The invention relates to a residual gas analyser for analysis of a residual gas, in particular a residual gas in an extreme ultraviolet (EUV) lithography system, comprising: an inlet system for admission of the residual gas from a vacuum environment into the residual gas analyser, and a mass analyser comprising a detector for detection of ionized constituents of the residual gas. The invention also relates to an EUV lithography system comprising such a residual gas analyser.

BACKGROUND

The EUV lithography system may be an EUV lithography apparatus (EUV scanner) for exposure of a wafer or some other optical arrangement that uses EUV radiation, for example an EUV metrology system, for example for inspection of masks, wafers or the like that are used in EUV lithography, an EUV test arrangement, etc.

An EUV lithography system is operated with EUV radiation at an operating wavelength in the EUV wavelength range of between about 5 nm and about 30 nm. The operating wavelength may, for example, be 13.5 nm or 6.8 nm. On account of the low transmission of all gases at wavelengths in the region of 13.5 nm—or else at 6.8 nm—it is necessary to operate the optical elements of such an optical arrangement in a vacuum environment in which only a residual gas is present. On account of the low transmission of practically all solid materials at these wavelengths, reflective optical elements (e.g. mirrors) are generally used in such EUV lithography systems.

The interaction of the EUV radiation with the residual gas in operation of the EUV lithography system forms a plasma; in other words, ionic, free-radical or neutral (excited) constituents of the residual gas are formed. The knowledge of the exact composition of this gas or plasma atmosphere in EUV lithography systems is of crucial importance for the operation of these complex pieces of technical equipment: if, in operation of the EUV lithography system, the composition of the residual gas specified in the design is not established, the EUV mirrors in particular are affected by degradation effects through oxidation and/or contamination, which lead to a reduction in the lifetime of the EUV mirrors and hence of the overall EUV lithography system.

The residual gas in the vacuum environment of an EUV lithography system generally includes molecular hydrogen ($H_2$) with a comparatively high partial pressure. The molecular hydrogen is generally supplied to the vacuum environment as purge gas in order to achieve a cleaning effect. In addition, the residual gas generally includes small additions of oxygen and/or nitrogen, and noble gases, e.g. Ar, He, . . . .

It is known that residual gas analysers can be used for analysis of the residual gas in such EUV lithography systems. The main problem with known residual gas analysers is the requirement imposed by the direct measurement range due to the high partial hydrogen pressures in the residual gas: the typical measurement situation requires highly sensitive detection of relevant neutral residual gas constituents (e.g. $H_2O$, $N_2$, $O_2$, . . . ), of constituents of the residual gas attributable to "hydrogen-induced outgassing" (HIO) (e.g. silane, $SiH_4$), and of plasma constituents (e.g. $N_2H^+$) of the residual gas with partial pressures down to the region of less than about $10^{-14}$ mbar in a matrix gas, typically in the form of hydrogen ($H_2$) having a partial pressure in the order of magnitude of $10^{-2}$ mbar. The dynamics of such a residual gas analyser therefore have to cover at least 12 orders of magnitude, which cannot be achieved by the residual gas analysers in current use: the dynamic range and hence also the detection limit is therefore inadequate, in particular for constituents of the residual gas such as $O_2$, $H_2O$, $C_xH_Y$, . . . .

For quantitative analysis, i.e. for determination of absolute amounts of analyte, reference measurements are additionally conducted with the aid of calibration gases (e.g. dodecane, $N_2$, $O_2$), which are admitted into the vacuum environment via calibration leaks. Nevertheless, the composition of the residual gas, in particular of the plasma generated in operation of the EUV lithography system, is currently known merely from simulations and model experiments.

WO 2010/022815 A1 describes an EUV lithography apparatus having a residual gas analyser having a storage device for storage of a contaminating substance present in a residual gas atmosphere of the EUV lithography apparatus. The storage, for example in an ion trap, is supposed to enable the detection of very small amounts of contaminating substances even at high residual gas pressures. The residual gas analyser may have an ionizing device for ionization of the contaminating substance, disposed in an interior of the EUV lithography apparatus. Through the use of a supply device having a vacuum tube with ion optics, it is possible to supply the ionized contaminating substance to the storage device.

SUMMARY

It is an object of the invention to provide a residual gas analyser and an EUV lithography system which enable the detection of very small amounts of constituents of the residual gas at high residual gas pressures, in particular during the operation of the EUV lithography system.

This object is achieved by a residual gas analyser of the type specified at the outset, further comprising: an ion transfer device for transferring the ionized constituents of the residual gas to the mass analyser, the ion transfer device having an ion filtering device designed for filtering of at least one ionized constituent of the residual gas.

The inventors have recognized that it is insufficient for achievement of the required high dynamic range and of the required high-sensitivity of the residual gas analyser to use a one-stage mass analyser, for example in the form of a quadrupole.

Multistage systems, for example systems comprising multiple series-connected quadrupoles or hybrid systems, are known inter alia in life sciences in the form of mass spectrometry-coupled liquid chromatography systems ("liquid chromatography-mass spectrometry"), and offer the advantage that the selectivity of the combined stages is multiplied. However, such systems are generally designed for operation at atmospheric pressure; this mode of operation is caused by the necessary spraying of liquids from chromatography. The fluid-dynamic parameters (inlet openings/geometries, pump-off stages) do not permit operation of such equipment at the pressures customary for EUV. Thus, there is an application gap for the boundary conditions that typically exist in EUV application (partial pressure measurements down to $10^{-14}$ mbar, recipient pressure $10^{-2}$ mbar), which is to be closed by the present invention. The ion transfer device generally has multiple ion optics arranged in series (in cascaded form).

The ion transfer device has two functions: 1.) To transfer ionized constituents of the residual gas (ions) that are formed in the vacuum environment, for example in an EUV plasma of an EUV lithography apparatus (native EUV ions), with maximum efficiency from the plasma space or from the vacuum environment into the mass analyser. 2.) To filter out native EUV ions that are formed in very high density in the plasma space during the transfer process, in order thus to multiply the dynamic range of the mass analyser by the filter quality. In this way, it is possible to specifically filter individual constituents of the residual gas—in accordance with particular mass-to-charge ratios. The filtered constituents of the residual gas may in particular be ions of the matrix gas or background gas which has a high partial pressure, for example hydrogen ($H_2$) and nitrogen ($N_2$) present in the residual gas.

It has been found to be favorable when the ion transfer device filters a range of mass-to-charge ratios as narrow as possible, i.e. when the barrier effect is limited to a comparatively small range of mass-to-charge ratios. The ion transfer device may be designed to change the interval of the blocked mass-to-charge ratios, in order to generate a barrier effect for different ionized constituents of residual gas, but this is not absolutely necessary.

In one embodiment, the ion filter device takes the form of a notch filter. The notch filter is a particularly narrowband type of band stop filter that filters only a narrow mass-to-charge range corresponding to an individual ionized constituent of the residual gas, i.e. only to one mass-to-charge ratio.

In one embodiment, the ion filter device takes the form of an RF-only quadrupole, an RF-only hexapole or an RF-only octopole. If an AC voltage rather than a DC voltage is applied to a quadrupole (or a hexapole, octopole, etc.), this is referred to as an RF-only quadrupole, hexapole, octopole etc., or as RF-only operation. In this state of operation, the quadrupole is fundamentally transmissive for all kinds of ions. With the aid of an additionally applied AC voltage, it is possible to specifically excite a single mass-to-charge ratio in order to filter out the corresponding ionized constituent of the residual gas, or specifically a particular ion. One example of such a transfer quadrupole that serves as notch filter is described in U.S. Pat. No. 5,672,870, which is incorporated into this application in its entirety by reference. It is also possible for RF-only hexapoles or RF-only octopoles to be designed for specific filtering of individual ionized constituents of the residual gas.

In a further embodiment, the mass analyser is designed as a time-of-flight (TOF) analyser. A TOF analyser has the advantage of high compactness or small design size, and possibly a mass resolution $m/\Delta m > 8000$. In addition, a TOF analyser permits the performance of rapid measurements. The TOF analyser serves to measure the time of flight of ionized constituents of the residual gas that are detected by a detector. The time of flight of the ionized constituents depends on their mass-to-charge ratio, and therefore the TOF analyser enables mass spectrometry analysis.

In order firstly to achieve the required dynamic range of at least $10^{12}$ and secondly a small design size, a quadrupole analyser is also suitable as well as a TOF analyser for the cascade of ion transfer device and mass analyser.

The detector may be selected from the group comprising: secondary electron multipliers and microchannel plates. The secondary electron multiplier may be formed from discrete dynodes. It is also possible for a secondary electron multiplier in the form of a channel electron multiplier with a continuous dynode to serve as detector. It is also possible to use microchannel plates, in particular multiple cascaded microchannel plates, as detector. All the detector types used may be extended by a discrete conversion dynode/electrode. In this case, the detectors mentioned multiply the electron current generated by the conversion dynode. It will be apparent that it is also possible to use types of detector other than those mentioned here in the mass analyser.

In a further embodiment, the mass analyser, at an outlet end of the inlet system, has an ion supply device for supply of ionized constituents of the residual gas that have not been filtered by the ion filter device to the detector. The ion supply device typically has ion optics which may take the form, for example, of a quadrupole optionally having an additional ion filter function. The ion supply device typically serves to supply native transferred EUV ions to the mass analyser or to the detector. Analysis of the constituents of the residual gas ionized by the EUV radiation generally does not require a dedicated ionization source in the residual gas analyser.

In a further embodiment, the residual gas analyser has at least one ionizing device for ionizing neutral constituents of the residual gas, where the ionizing device is preferably disposed at an inlet end of the inlet system. The ionizing device serves to ionize those constituents of the residual gas that are not ionized in the interaction with the EUV radiation, or have been neutralized again before they enter the inlet system or the ion transfer stage. The ionization of neutral constituents of the residual gas allows these likewise to pass through the ion supply device and be analyzed or detected in the mass analyser. The ionizing device is preferably disposed at the inlet end of the inlet system. The disposing of the ionizing device at the inlet end of the inlet system has been found to be favorable because ions can be transported substantially more efficiently (by electromagnetic fields) than neutrals. The latter are subject to molecular flow in the typical EUV pressure range specified, and hence are fundamentally undirected in their movement, which leads to a considerable loss on the path through the ion transfer device.

In principle, it is also possible to dispose the ionizing device at the outlet end of the inlet system or ion transfer device, i.e. on that side of the ion transfer device remote from the EUV vacuum environment. The neutral constituents of the residual gas pass here through the ion transfer device before they are ionized by the ionizing device. In this case, it is necessary to adjust the geometry of the ion transfer device for the supply or sampling of gaseous neutral particles. It is also possible that the residual gas analyser has two ionizing devices, one of them typically disposed at the inlet end of the inlet system or ion transfer device and the other at the outlet end of the inlet system or ion transfer device.

For the application described, in which the ionizing device is supplied with ionized constituents of the residual gas, it is necessary that the ionizing device is transmissive in respect of these ionized constituents of the residual gas. This is achieved in that the ionizing device likewise has ion optics properties or has ion optics for the flight of ions.

In one development, the ionizing device is selected from a group of suitable devices that includes: electron ionization device and high-frequency plasma ionization device. Electron (beam) ionization uses an electron source having a filament (glow wire) for the ionization, in order, through the thermionic effect, to generate an electron beam that hits the gas to be ionized and ionizes it. In the case of a plasma ionization device, specifically in the case of a radio-frequency (RF) plasma ionization device, a radio-frequency alternating field is used for the ionization, which leads to ignition of a plasma, in order to bring about the ionization. It will be apparent that it is also possible to use types of ionizing devices other than those described here in the residual gas analyser in order to ionize constituents of the residual gas.

When an electron ionization device is used, it is favorable when it has an optimized source geometry in order to tolerate a maximum pressure in the vessel in which the ionization is effected. In this regard, it has been found to be favorable when the filament(s) that serve to generate the electron beam are disposed outside the source volume, in order to achieve better pumping of the filaments. In general, it is favorable when the filaments have a maximum lifetime, in order that the measurement time and lifetime of the electron beam ionization device play only a minor role.

The residual gas analyser may of course include further components that have not been described above. The residual gas analyser generally also has at least one vacuum pump in order to generate a defined pressure in the ion transfer device, in the mass analyser and in the ionizing device.

A further aspect of the invention relates to an EUV lithography system, in particular an EUV lithography apparatus, having at least one residual gas analyser for analysis of a residual gas in a vacuum environment of the EUV lithography system.

With the aid of the residual gas analyser described above, the desired characterization of the vacuum environment or monitoring of the vacuum environment, in particular during the operation of the EUV lithography system, is possible. It is possible here to analyze the constituents of the residual gas, e.g. $N_2$, $H_2O$, $O_2$, $H_2$, and hydrocarbons ($C_XH_Y$) and further constituents of the residual gas. In particular, it is possible here to detect critical contaminants that are generated under the specific plasma conditions in the vacuum environment through ultra-trace analysis. These critical contaminants are typically substances that are formed in the interaction of components disposed in the vacuum environment with a hydrogen plasma which is formed in the vacuum environment on account of the interaction with the EUV radiation (what are called HIO species, for example silane $SiH_4$). The concentration or partial pressures of these critical contaminants can be measured with the aid of the residual gas analyser in situ with a measurement time in the order of magnitude of several minutes. In the case of the conventional measurements in which adsorption targets ("witness samples") are introduced into the vacuum environment, which are subsequently analyzed ex situ, the measurement time, by contrast, is typically in the order of magnitude of a few weeks.

In one embodiment, the EUV lithography system comprises at least one optical element for reflection of EUV radiation, wherein an inlet end of the inlet system of the residual gas analyser is disposed at a distance of less than 5 cm, preferably of less than 3 cm, from a reflective surface of the optical element. Since the surface of the optical element, more specifically a reflective coating applied there, can be degraded as a result of the action of the plasma, it is favorable when the inlet end of the inlet system is as close as possible to the surface of the reflective optical element. A respective optical element is typically encapsulated in its own vacuum chamber ("mini-environment") in which the inlet end of the inlet system is present. It is unnecessary for the entire residual gas analyser to be disposed close to the surface of the optical element; for example, the control electronics may be installed two meters or more away from the inlet end of the inlet system.

Further features and advantages of the invention will be apparent from the description of working examples of the invention that follows, with reference to the figures of the drawing, which show details essential to the invention, and from the claims. The individual features can each be implemented alone or in a plurality in any combination in one variant of the invention.

BRIEF DESCRIPTION OF THE DRAWINGS

Working examples are shown in the schematic drawing and are elucidated in the description that follows. The figures show.

DETAILED DESCRIPTION

In the description of the drawings that follows, identical reference signs are used for components that are the same or analogous, or have the same or the analogous function.

Figure 1:
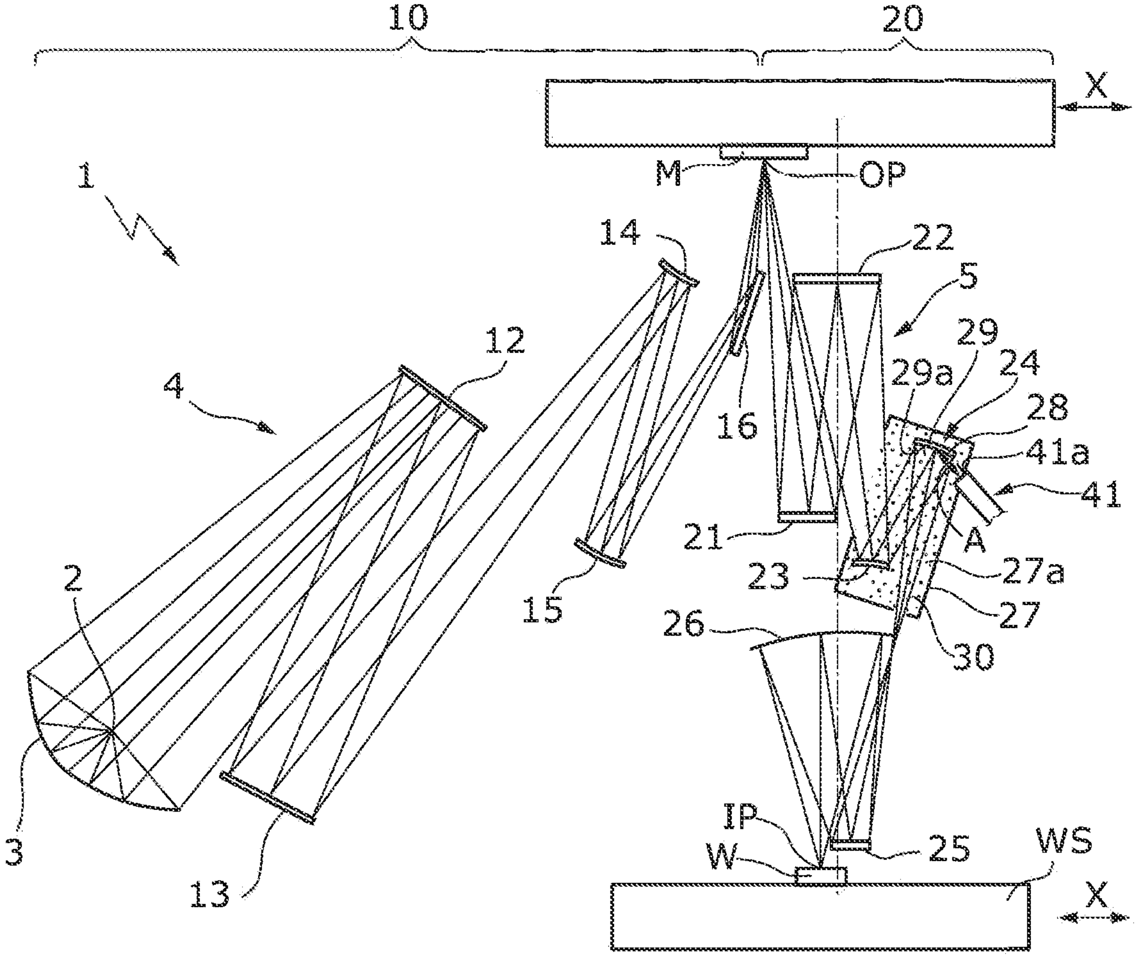
FIG. 1 a schematic diagram of an EUV lithography apparatus with an inlet system of a residual gas analyser for analysis of the residual gas, and FIGS. 2A, 2B schematic diagrams of exemplary residual gas analysers in accordance with FIG. 1, in particular residual gas analysers with ion transfer devices equipped with ionizing devices disposed either at an inlet end (FIG. 2A) or at an outlet end (FIG. 2B) of the ion transfer devices.

FIG. 1 shows a schematic of the construction of an optical arrangement for EUV lithography in the form of an EUV lithography apparatus 1, specifically of a so-called wafer scanner. The EUV lithography apparatus 1 comprises an EUV light source 2 for generating EUV radiation, which has a high energy density in the EUV wavelength range below 50 nanometers, in particular between about 5 nanometers and about 15 nanometers. The EUV light source 2 can be configured for example in the form of a plasma light source for generating a laser-induced plasma. The EUV lithography apparatus 1 shown in FIG. 1 is designed for an operating wavelength of the EUV radiation of 13.5 nm. However, it is also possible for the EUV lithography apparatus 1 to be configured for a different operating wavelength in the EUV wavelength range, such as 6.8 nm, for example.

The EUV lithography apparatus 1 furthermore comprises a collector mirror 3 in order to focus the EUV radiation of the EUV light source 2 to form an illumination beam 4 and thereby to increase the energy density further. The illumination beam 4 provides the illumination of a structured object M with an illumination system 10, which in the present example has five reflective optical elements 12 to 16 (mirrors).

The structured object M can be for example a reflective photomask, which has reflective and non-reflective, or at least less reflective, regions for producing at least one structure on the object M. Alternatively, the structured object M can be a plurality of micro-mirrors, which are arranged in a one-dimensional or multi-dimensional arrangement and which are selectively movable about at least one axis, in order to set the angle of incidence of the EUV radiation on the respective mirror.

The structured object M reflects part of the illumination beam 4 and shapes a projection beam path 5, which carries the information about the structure of the structured object M and is radiated into a projection lens 20, which generates an image of the structured object M or of a respective partial region thereof on a substrate W. The substrate W, for example a wafer, comprises a semiconductor material, for example silicon, and is disposed on a mounting, which is also referred to as a wafer stage WS.

In the present example, the projection lens 20 has six reflective optical elements 21 to 26 (mirrors) in order to generate an image of the structure that is present at the structured object M on the wafer W. The number of mirrors in a projection lens 20 typically lies between four and eight; however, only two mirrors can also be used, if appropriate.

In addition to the reflective optical elements 3, 12 to 16, 21 to 26, the EUV lithography apparatus 1 also comprises non-optical components, which can be for example carrying structures for the reflective optical elements 3, 12 to 16, 21 to 26, sensors, actuators, etc.

The reflective optical elements 12 to 16 of the illumination system 10 and the reflective optical elements 21 to 26 of the projection lens 20 are arranged in a vacuum environment. In this case, a respective optical element 3, 12 to 16, 21 to 26 is typically arranged in a dedicated vacuum chamber, also referred to as "mini-environment". By way of example, FIG. 1 shows such a vacuum chamber 27, in which the fourth reflective optical element 24 of the projection system 20 is disposed. The projection beam path 5 enters at a first opening from a further vacuum chamber (not shown) into the vacuum chamber 27 having the fourth optical element 24, and exits at a second opening in the direction of a further vacuum chamber in which the fifth optical element 25 of the projection system 20 is disposed. It will be apparent that it is also possible for two or more of the optical elements 12 to 16 and 21 to 26 to be disposed in a respective (common) vacuum chamber. The entire EUV lithography apparatus 1 shown in FIG. 1 is additionally surrounded by a housing (not shown), which is likewise a vacuum chamber.

The optical element 24 disposed in the vacuum chamber 27 has a substrate 28 composed of titanium-doped quartz glass, to which has been applied a reflective multilayer coating 29 optimized for the reflection of EUV radiation 5 at the operating wavelength $\lambda_B$ of 13.5 nm. The multilayer coating 29 for this purpose has alternating layers of molybdenum and silicon. At the operating wavelength $\lambda_B$ of 13.5 nm, the silicon layers have a higher real part of the refractive index than the molybdenum layers. Depending on the exact value of the operating wavelength $\lambda_B$, other material combinations, for example molybdenum and beryllium, ruthenium and beryllium, or lanthanum and $B_4C$, are likewise possible. In order to protect the multilayer coating 29, a protective layer of ruthenium is applied to it. The surface 29*a* of the reflective multilayer coating 29, more specifically the protective layer, is exposed to a vacuum environment 27*a* formed in an interior of the vacuum chamber 27.

Exposed regions of the surface 29*a* of the optical element 24 are exposed here to a residual gas 30 within the vacuum chamber 27. Constituents of the residual gas 30 are typically molecular hydrogen ($H_2$), molecular oxygen ($O_2$), nitrogen ($N_2$), water ($H_2O$), noble gases, e.g. Ar, He, etc. The molecular hydrogen $H_2$ serves as purge gas and is supplied to the vacuum chamber 27 or vacuum environment 27*a* in a controlled manner via a gas feed (not shown). The molecular hydrogen $H_2$ in the vacuum environment 27 has a comparatively high partial pressure in the order of magnitude of $10^{-2}$ mbar.

The interaction with the EUV radiation 4, 5 in the EUV lithography apparatus 1, specifically the interaction with the hydrogen $H_2$, generates a plasma in the vacuum chamber 27, with formation of ionic plasma species ($H^+$) or free-radical plasma species (H) inter alia. The hydrogen plasma serves to remove contamination in the form of hydrocarbons from the surface 29*a* of the reflective optical element 24. However, the hydrogen plasma also leads to unwanted reduction reactions on non-optical components disposed in the vacuum environment 27*a*, which can form volatile hydrides with the hydrogen plasma. This is the case, for example, for components that contain silicon, in which case the reaction with the hydrogen plasma forms gaseous silane ($SiH_4$) inter alia. Silane ($SiH_4$) is a critical contaminant for the surface 29*a* of the reflective optical element 24, since this contamination, in the case of reaction with the material of the surface 29*a*, e.g. Ru, forms a chemical compound that can be removed from the surface 29*a* only with great difficulty, if at all, which reduces the lifetime of the optical element 24.

The monitoring of the composition of the residual gas 30, or knowledge of the composition of the residual gas 30 in general, in particular the proportion of critical contaminants (e.g. $SiH_4$), is thus of crucial importance for the operation of the EUV lithography apparatus 1. For characterization of the composition of the residual gas 30, in particular of the ionic or free-radical plasma species present therein, or of the critical contaminants, a residual gas analyser 40 is used, which is described in detail hereinafter with reference to FIGS. 2A and 2B.

The residual gas analyser 40 has an inlet system 41 having an inlet end 41*a* that has an opening to the inlet of the residual gas 30 present in the vacuum chamber 27. In order to very accurately characterize the composition of the residual gas 30 at the site of the reflective optical element 24, in particular at the surface 29*a*, the inlet end 41*a* or inlet opening is disposed at a distance A of less than 5 cm, in particular of less than 3 cm, away from the surface 29*a*, as shown schematically in FIG. 1.

Figure 2A:
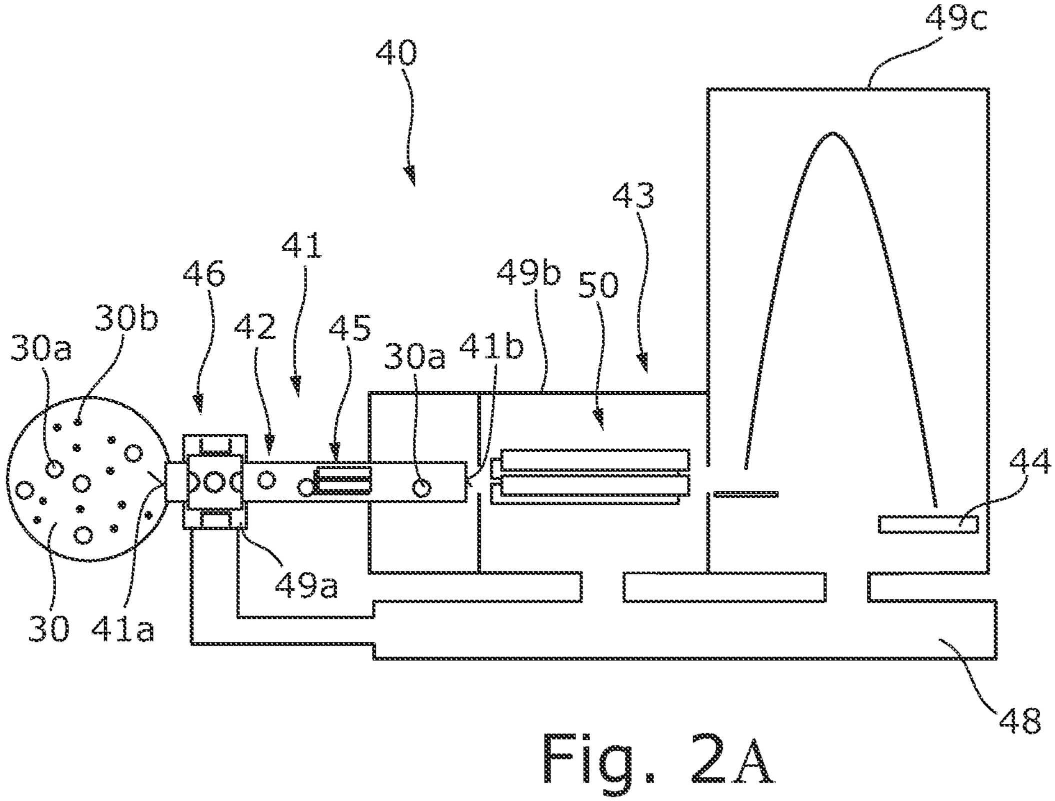

The residual gas analyser 40 has a mass analyser 43 comprising a detector 44 for detection of ionized constituents 30*a* of the residual gas. The residual gas analyser 40 also has an ion transfer device 42 for transferring the ionized constituents 30*a* of the residual gas 30 to the mass analyser 43. The constituents of the residual gas 30 can be ionized directly in the vacuum environment 27*a* of the vacuum chamber 27 of the EUV lithography apparatus 1 via the action of the EUV radiation 4, 5. For ionization of neutral constituents 30*b* of the residual gas 30, the residual gas analyser 40 has an ionizing device 46, which, in the example shown in FIG. 2A, is disposed at the inlet end 41*a* of the inlet system 41. The ionizing device 46 is ideally transparent to the ionic constituents 30*a* of the residual gas 30 already formed in the vacuum environment 27*a*, meaning that it has no effect on the already ionized constituents 30*a* of the residual gas 30. This can be achieved in that the ionizing device 46 has ion optics for transfer of the ionic constituents 30*a* of the residual gas 30 formed in the vacuum environment 27*a*.

For admission of the ionized constituents 30*a* of the residual gas 30 into the residual gas analyser 40, the inlet system 41 has the ion transfer device 42, comprising a vacuum tube and ion optics disposed in the vacuum tube or multiple (cascaded) ion optics arranged in series in the vacuum tube. With the aid of the inlet system 41 having the ion transfer device 42, continuous supply of ionized constituents 30*a* of the residual gas 30 to the residual gas analyser 40 is possible, but the inlet system 41 may optionally also serve for pulsed supply of the ionized constituents 30*a* of the residual gas 30 to the residual gas analyser 40, and for that purpose have one or more controllable valves. The inlet system 41 encasing the ion transfer device 42, more specifically the vacuum tube, may have a comparatively long length of, for example, more than 30 cm.

The concentration or partial pressure of, for example, silane and other constituents of the residual gas 30 is generally much lower than that of molecular hydrogen (about $10^{-2}$ mbar) and may, for example, be in the order of magnitude of about $10^{-14}$ mbar. In order, in spite of this large dynamic range, to be able to detect even ultrasmall amounts of ionized constituents 30*a* of the residual gas 30, the ion transfer device 42 may be operated as a filter device, for which purpose it has an ion filter device 45 in the form of a quadrupole. For the filtering, the ion filter device 45 in the form of the quadrupole is operated in the RF-only mode of operation, in which only an AC voltage rather than a DC voltage is applied, extended by additional application of a further RF frequency that resonantly filters individual m/z ranges or a single m/z value.

The ion filter device in the form of the RF-only quadrupole 45 is utilized to specifically filter individual ionized constituents 30*a* of the residual gas 30, such that they do not enter the mass analyser 43. The filtered ionized constituent(s) 30*a* may have exactly one mass-to-charge ratio. The ion filter device 45 in this case serves as a notch filter, i.e. as a particularly narrowband type of band stop filter which filters only a narrow mass-to-charge range corresponding to a single ionized constituent 30*a* to be filtered in the residual gas 30, for example molecular hydrogen $H_2$ or molecular nitrogen $N_2$. For the filtering of a particular ionized constituent 30*a* of the residual gas 30, the alternating field applied to the RF-only quadrupole 45 may be suitably chosen or adjusted as described, for example, in U.S. Pat. No. 5,672,870 cited at the outset. By suitable adjustment or variation of the alternating field, it is possible to determine which ionic constituent 30*a* of the residual gas 30 is filtered by the ion transfer device 42.

The ion transfer device 42, implemented by the ion filter device 45 with the filter function of a notch filter, may also be designed in another way, for example as an RF-only hexapole, as an RF-only 14ctupole, etc. What is important is that the ion transfer device 42 enables filtering of ionized constituents 30*a* of the residual gas 30 that have a high partial pressure, for example ionized hydrogen $H^+$, etc., in order in this way to be able to determine the concentration of the remaining unfiltered ionized constituents 30*a* of the residual gas 30 with high accuracy.

Figure 2B:
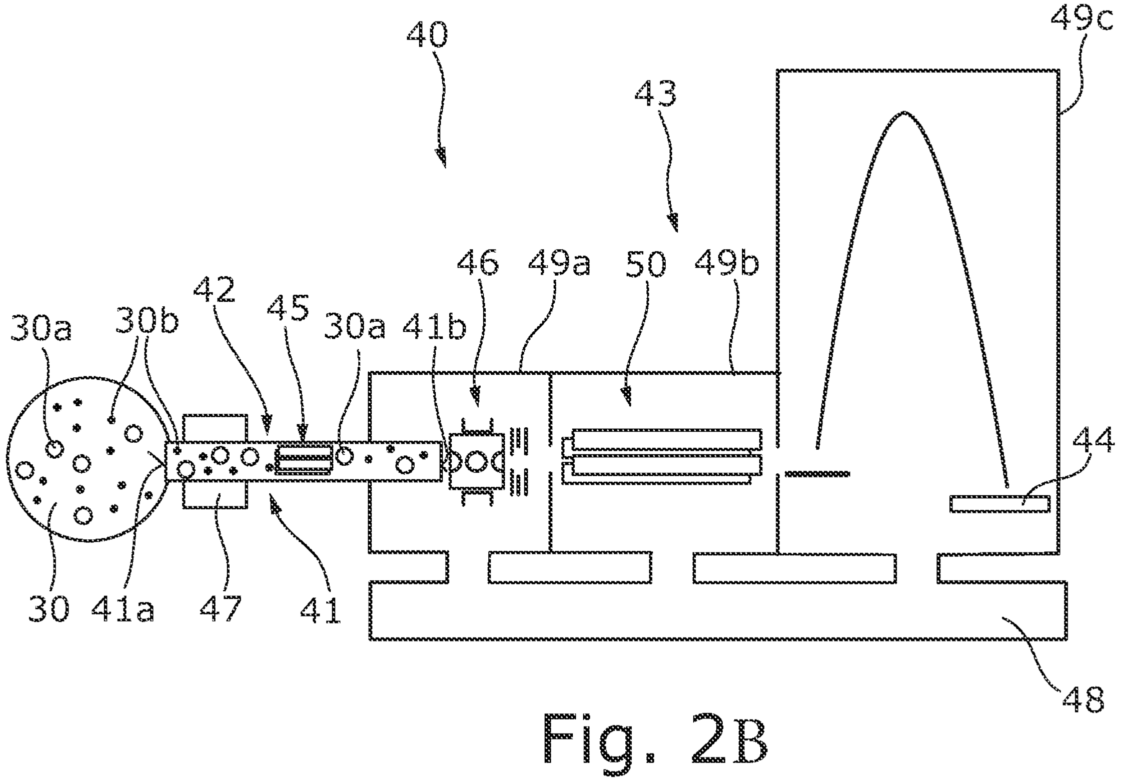

In the examples shown in FIGS. 2A and 2B, the mass analyser 43 takes the form of a time-of-flight (TOF) analyser. A TOF analyser 43 has the advantage of high compactness or small design size, and a mass resolution up to m/Δm >8000 with small measurement times. The TOF analyser 43 serves for time-of-flight measurement of the ionized constituents 30*a* of the residual gas 30, which are supplied to and detected by a detector 44 via an ion supply device 50 of the mass analyser 43 disposed at an outlet end 41*b* of the inlet system 41. The time of flight of the Ionized constituents 30*a* depends on their mass-to-charge ratio, which enables mass spectrometry analysis of the ionized constituents 30*a* of the residual gas 30. The ion supply device 50 of the mass analyser 43 in the form of the TOF analyser takes the form of a quadrupole in the example shown. The ion supply device 50 in the form of the quadrupole may optionally be operated as an additional ion filter device when it is operated in the RF-only mode of operation (see above).

The detector 44 in the examples shown in FIGS. 2A and 2B takes the form of cascaded microchannel plates. The detector 44 may alternatively take other forms, for example of a secondary electron multiplier. In the latter case, the detector 44 may have a separate conversion dynode, which may be advantageous particularly when a secondary electron multiplier is used in the form of a continuous dynode.

The electron ionization device 46 shown in FIGS. 2A and 2B, for ionization of the residual gas 30, has an electron source having a filament (glow wire), in order to generate an electron beam by virtue of the thermionic effect, which hits and ionizes the constituents of the residual gas 30 to be ionized. The electron ionization device 46 has an optimized source geometry which enables generation of a high pressure in the vessel of the electron ionization device 46 in which the ionization is effected. In order to increase the lifetime, it has been found to be favorable when the filament(s) that serve to generate the electron beam are disposed outside the source volume, since they can be pumped better in that position.

The residual gas analyser 40 shown in FIG. 2B differs from the residual gas analyser 40 shown in FIG. 2A in that ionization device 46 in the form of an electron ionization device 46 is disposed not at the inlet end 41*a* of the inlet system 41 but rather at the outlet end 41*b* of the inlet system 41 upstream of the ion transfer device 50 of the mass analyser 43. Nevertheless, the residual gas analyser 40 shown in FIG. 2B also has an inlet system 41 with an ion transfer device 42. It is possible via the ion transfer device 42 to supply the constituents 30*a* of the residual gas 30 that have been ionized by the EUV radiation 4, 5 to the residual gas analyser 40 or to the electron ionization device 46. Via the inlet system 41, neutral constituents 30*b* of the residual gas also reach and can be ionized by the electron ionization device 46.

In the example shown in FIG. 2B, the residual gas analyser 40 has an additional (optional) ionization device 47 disposed at the inlet end 41*a* of the inlet system 41. The additional ionization device 47 takes the form of a high-frequency plasma ionization device and serves to generate ionized constituents 30*a* of the residual gas 30 by the generation of a plasma. The use of different ionization devices 46, 47 may be advantageous in order to ionize different constituents of the residual gas 30: the plasma ionization device 47 typically enables "gentle" ionization in which there is only a small risk of fragmentation of the constituents of the residual gas 30 to be ionized. The plasma ionization device 47 may in particular serve to generate hydrogen-containing ions from the gas constituents of the residual gas 30, for example $H^+$, $H^{3+}$, $N_2H^+$, etc.

It will be apparent that—by contrast with what is shown in FIG. 2B—the residual gas analyser 40 may have only a single plasma ionization device 47, which may be disposed at the inlet end 41*a* of the inlet system 41 or at the outlet end 41*b* of the inlet system 41.

In the examples shown in FIGS. 2A and 2B, ion optics that are not shown in each case are disposed between the inlet system 41 and the ion supply device 50 or the electron ionization device 46, and between the ion supply device 50 and the detector 44. The electron ionization device 46, the ion supply device 50 and the detector 44 are accommodated in separate housing portions 49*a-c* of the residual gas analyser 40, and are pumped differentially with the aid of a vacuum pump device 48. In the example shown, the vacuum pump device 48 used is a turbomolecular pump, which takes the form of a so-called split flow pump and is configured to generate three different pressures in the three housing portions 49*a-c*.

With the aid of the residual gas analyser 40 described above, the demands on the analysis or the monitoring of a residual gas 30 in the EUV lithography apparatus 1 can be satisfied with regard to the construction space available and measurement time available, and in particular with regard to the large dynamic range required for analysing the residual gas.

What is claimed is:

1. A residual gas analyser for analysis of a residual gas, comprising:

an inlet system comprising an ion transfer device and configured to admit the residual gas from a vacuum environment into the residual gas analyser, and a mass analyser comprising a detector configured to detect ionized constituents of the residual gas, wherein:

the ion transfer device is configured to transfer the ionized constituents of the residual gas to the mass analyser, and the ion transfer device comprises an ion filtering device configured to filter at least one ionic constituent of the ionic constituents of the residual gas based on its mass-to-charge ratio, so that the at least one ionic constituent does not enter the mass analyser.

2. The residual gas analyser as claimed in claim 1, in which the ion filter device is configured as a notch filter.

3. The residual gas analyser as claimed in claim 1, in which the ion filter device is configured as an RF-only quadrupole, an RF-only hexapole or an RF-only octopole.

4. The residual gas analyser as claimed in claim 1, in which the mass analyser is configured as a time-of-flight analyser.

5. The residual gas analyser as claimed in claim 1, in which the detector is selected from the group consisting essentially of secondary electron multipliers and microchannel plates.

6. The residual gas analyser as claimed in claim 1, in which the mass analyser further comprises an ion supply device at an outlet end of the inlet system, wherein the ion supply device is configured to supply further ionized constituents of the residual gas that have not been filtered by the ion filter device to the detector.

7. The residual gas analyser as claimed in claim 1, further comprising:

at least one ionizing device configured to ionize neutral constituents of the residual gas.

8. The residual gas analyser as claimed in claim 7, in which the ionizing device is disposed at an inlet end of the inlet system.

9. The residual gas analyser as claimed in claim 7, in which the ionizing device comprises ion optics for transferring the ionized constituents of the residual gas formed in the vacuum environment.

10. The residual gas analyser as claimed in claim 7, in which the ionizing device is selected from the group consisting essentially of an electron ionization device and a high-frequency plasma ionization device.

11. An extreme ultraviolet (EUV) lithography system, arranged in a vacuum environment and comprising:

at least one residual gas analyser as claimed in claim 1 and arranged for analysis of a residual gas in the vacuum environment of the EUV lithography system.

12. The EUV lithography system as claimed in claim 11, further comprising:

at least one optical element configured and arranged to reflect EUV radiation, wherein an inlet end of the inlet system of the residual gas analyser is disposed at a distance of less than 5 cm from a reflective surface of the optical element.

* * * * *